US012577922B2

(12) United States Patent
Oizumi et al.

(10) Patent No.: US 12,577,922 B2
(45) Date of Patent: Mar. 17, 2026

(54) CYLINDER

(71) Applicants: TPR Co., Ltd., Tokyo (JP); TPR Industry Co., Ltd., Yamagata (JP)

(72) Inventors: Takashi Oizumi, Yamagata (JP); Seiji Tamaki, Tokyo (JP); Kiyoyuki Kawai, Tokyo (JP)

(73) Assignees: TPR Co., Ltd., Tokyo (JP); TPR Industry Co., Ltd., Yamagata (JP)

( * ) Notice: Subject to any disclaimer, the term of this patent is extended or adjusted under 35 U.S.C. 154(b) by 91 days.

(21) Appl. No.: 18/698,909

(22) PCT Filed: Apr. 25, 2022

(86) PCT No.: PCT/JP2022/018684
§ 371 (c)(1),
(2) Date: Nov. 21, 2024

(87) PCT Pub. No.: WO2023/067833
PCT Pub. Date: Apr. 27, 2023

(65) Prior Publication Data
US 2025/0320843 A1 Oct. 16, 2025

(30) Foreign Application Priority Data

Oct. 19, 2021 (JP) ................................. 2021-170926

(51) Int. Cl.
*F02F 1/00* (2006.01)
*F16J 10/04* (2006.01)
(52) U.S. Cl.
CPC ................. *F02F 1/00* (2013.01); *F16J 10/04* (2013.01)

(58) Field of Classification Search
CPC ...... F02F 1/00; F02F 1/20; F02F 1/004; F02F 2200/00; F16J 10/04
See application file for complete search history.

(56) References Cited

U.S. PATENT DOCUMENTS 9,581,103 B1 * 2/2017 Qin ......................... C22C 38/08
9,915,220 B2 * 3/2018 Meirelles Tomanik .. F02F 5/00
(Continued)

FOREIGN PATENT DOCUMENTS

CN 101809271 A 8/2010
CN 109844292 A 6/2019
(Continued)

OTHER PUBLICATIONS

Extended European Search Report in EP Application No. 22883146.7 dated Jan. 29, 2025, 6 pages.
(Continued)

*Primary Examiner* — Grant Moubry
(74) *Attorney, Agent, or Firm* — MARSHALL, GERSTEIN & BORUN LLP

(57) ABSTRACT
A cylinder includes grooving in the inner peripheral surface of the cylinder. In the cylinder, the grooving includes a honed groove and recessed grooves of which the groove widths and groove depths are more than those of the honed groove, the honed groove and the recessed grooves extend in the circumferential direction of the cylinder and include an inclination angle with respect to a direction perpendicular to the axis direction of the cylinder, and a length of 4 mm in which four or more of the recessed grooves exist in the axis direction of the cylinder in a region in which an oil ring slides in a case in which a crank angle is 50° or more and 140° or less can be selected on the inner peripheral surface of the cylinder.

10 Claims, 3 Drawing Sheets

Combustion Chamber Side

Crank Chamber Side

(56)  References Cited

U.S. PATENT DOCUMENTS

| | | | | |
|---|---|---|---|---|
| 10,760,525 | B2 | 9/2020 | Kaneko et al. | |
| 11,536,218 | B1 * | 12/2022 | Batta ........................ | F16J 10/04 |
| 2010/0288222 | A1 | 11/2010 | Urabe et al. | |
| 2014/0345453 | A1 * | 11/2014 | Oh ........................... | F16J 10/04 |
| | | | | 92/169.1 |
| 2015/0192063 | A1 * | 7/2015 | Chang ...................... | F02F 1/20 |
| | | | | 123/193.2 |
| 2017/0167430 | A1 * | 6/2017 | Bettini Rabello ........ | F02F 1/16 |
| 2018/0066602 | A1 * | 3/2018 | Park .......................... | F02F 1/20 |
| 2020/0049099 | A1 | 2/2020 | Kaneko et al. | |
| 2020/0256277 | A1 * | 8/2020 | Kawai ...................... | F16J 10/00 |

FOREIGN PATENT DOCUMENTS

| | | | | | | |
|---|---|---|---|---|---|---|
| DE | | 10015223 | A1 * | 10/2000 | ............ | B24B 33/02 |
| JP | | S56-043441 | U | 4/1981 | | |
| JP | | S60-1504 | B | 1/1985 | | |
| JP | | H4-106560 | U | 9/1992 | | |
| JP | | 05065849 | A * | 3/1993 | | |
| JP | | 5513945 | B | 6/2014 | | |
| JP | | 2019-078267 | A | 5/2019 | | |
| KR | | 2011071176 | A * | 6/2011 | | |

OTHER PUBLICATIONS

Search Report in International Application PCT/JP2022/018684 dated Jul. 5, 2022, 2 pages.

* cited by examiner

Combustion Chamber Side

Crank Chamber Side

Axis
Direction

Direction
Perpendicular
to Axis
Direction

CYLINDER

TECHNICAL FIELD

The present invention relates to a cylinder that is used in an internal combustion engine.

BACKGROUND ART

Dominating cylinders for internal combustion engines include inner peripheral surfaces made of cast iron. Examples thereof include: structures in which cylinder liners made of cast iron are insert-cast with a block made of aluminum alloy; monoblock structures made of cast iron; and structures into which dry liners made of cast iron or wet liners made of cast iron are inserted.

In contrast, there are also cylinders including inner peripheral surfaces subjected to thermal spraying or coating such as plating, excellent in wear resistance, or including aluminum alloy for direct sliding.

Reductions in the amount of emitted $CO_2$ and in the amount of used fossil fuel are demanded in all the structures. Therefore, technologies to reduce friction by controlling the roughness and structures of the inner peripheral surfaces of cylinders are examined.

For example, Patent Document 1 discloses a cylinder for an internal combustion engine, of which the friction mean effective pressure can be reduced without performing complicated work, wherein the inner wall surface thereof defined into an upper region, a lower region, and a stroke central region, and the surface roughness of the stroke central region is more than the surface roughness of the upper region or the lower region.

Patent Document 2 discloses that the inner peripheral surface of a honed cylinder liner axially includes waviness, whereby a lubrication state between a piston and a cylinder liner is favorably maintained.

Patent Document 3 discloses that the lubrication performance of a cylinder liner is improved by forming the piston ring sliding surface of the cylinder liner to have an undulated surface with recesses and projections along the direction of sliding the piston ring, and by forming a wave with the greatest depth in the vicinity of the central portion of the stroke of sliding a first piston ring.

Patent Document 4 discloses that reciprocation friction between a piston ring and the inner wall surface of a cylinder is reduced by forming recesses in the stroke central region of the inner wall surface of the cylinder, setting the total of the areas of all the recesses at 1 to 80% with respect to the area of the stroke central region, and allowing the inner wall surface to include a region, other than the stroke central region, on which no recesses are formed.

PRIOR ART

Patent Document

Patent Document 1: Japanese Patent Laid-Open No. 2019-78267

Patent Document 2: Japanese Utility Model Laid-Open No. H4-106560

Patent Document 3: Japanese Patent Publication No. S60-001504

Patent Document 4: Japanese Patent No. 5513945

SUMMARY OF THE INVENTION

Problems to be Solved by the Invention

Patent Document 1, as described above, describes that it is found that the influence of the shearing resistance of oil on a friction loss is large in the stroke central region which is a region with a high sliding speed between a piston ring and the inner wall surface of a cylinder liner. The friction loss of an internal combustion engine is noticeable in the vicinity of the stroke central portion with a great work load. Thus, a reduction in friction in the vicinity of the stroke central portion without deteriorating oil consumption performance is effective at reducing the amount of emitted $CO_2$, and Patent Document 1, as described above, proposes that the surface roughness of the stroke central portion is increased. However, the friction reduction effect was not sufficiently obtained in the surface roughness of a plateau surface formed by honing with an adjusted grindstone and then plateau working, and the surface roughness was susceptible to improvement.

In a case in which waviness merely existed on the inner peripheral surface of a cylinder, a waviness pitch was axially 10 to 20 mm, and a waviness depth of 1 to 5 µm, as described above in Patent Document 2, the behavior of the piston ring was able to be influenced, and a friction reduction effect was not sufficiently obtained, and was susceptible to improvement.

In a case in which a wave depth on the inner surface of a cylinder liner was 0.005 to 0.1 mm, as described above in Patent Document 3, oil consumption performance and friction characteristics were able to deteriorate.

In addition, in a case in which the maximum heights Ry of the surfaces of a plurality of formed recesses was 0.1 µm or more and 30 µm or less, as described above in Patent Document 4, a friction reduction effect was not sufficiently obtained, and was susceptible to improvement.

An objective of the present invention is to provide a cylinder, in which a higher friction reduction effect can be obtained, by a method different from the already proposed methods.

Means for Solving the Problems

The present inventors proceeded with examination for solving the problems described above, and found that a high friction reduction effect is obtained by performing surface finishing so that a stroke central region in the inner peripheral surface of a cylinder includes a honed groove, and includes not less than a certain number of recessed grooves of which the groove widths and groove depths are more than those of the honed groove. The present invention was thus accomplished.

The present invention is a cylinder including grooving in an inner peripheral surface of the cylinder, wherein the grooving includes a honed groove and recessed grooves of which groove widths and groove depths are more than those of the honed groove, the honed groove and the recessed grooves extend in a circumferential direction of the cylinder and include an inclination angle with respect to a direction perpendicular to an axis direction of the cylinder, and a length of 4 mm in which four or more of the recessed grooves exist in an axis direction of the cylinder in a region in which an oil ring slides in a case in which a crank angle is 50° or more and 140° or less can be selected on the inner peripheral surface of the cylinder.

Preferred is an aspect in which the honed groove and the recessed grooves include a point at which the recessed grooves cross each other in the region in which the oil ring slides in the case in which the crank angle is 50° or more and 140° or less.

The recessed grooves preferably have a groove width of 30 μm or more.

It is preferable that the selected length of 4 mm further satisfies at least one of parameters described in the following (i) to (vi):

(i) a mean depth W of a waviness motif of an envelope waviness curve is 0.28 μm or more;

(ii) (mean depth W of waviness motif of envelope waviness curve)×(mean length AW of waviness motif) is 80 μm² or more and 300 μm² or less;

(iii) (difference Rke between levels of cores of envelope waviness curve)/(difference Rk between levels of cores of roughness curve) is 0.6 or less;

(iv) (mean depth Rvke of protruding trough of envelope waviness curve)/(mean depth Rvk of protruding trough of roughness curve) is 0.9 or less;

(v) (mean height Rpke of protruding crest+difference Rke between levels of cores+mean depth Rvke of protruding trough, of envelope waviness curve)/(mean height Rpk of protruding crest+difference Rk between levels of cores+mean depth Rvk of protruding trough, of roughness curve) is 0.9 or less; and (vi) (mean depth Rvke of protruding trough of envelope waviness curve)/(mean depth W of waviness motif of envelope waviness curve) is 1.0 or less.

Preferred is an aspect in which a length of 4 mm in which four or more of the recessed grooves exist in an axis direction of the cylinder in a region in which an oil ring slides in a case in which a crank angle including a top dead point is 0° or more and less than 50° is incapable of being selected on the inner peripheral surface of the cylinder.

Effects of the Invention

A cylinder in which the friction of a sliding surface is allowed to be lower than a conventional level to enable improvement in fuel efficiency without considerably deteriorating oil consumption performance can be provided by forming recessed grooves as well as a honed groove in a stroke central region in accordance with the present invention. As a preferred aspect, the number of recessed grooves is reduced or any recessed groove is not allowed to exist in the vicinity of a top dead point, whereby compatibility with oil consumption performance can be attempted.

MODE FOR CARRYING OUT THE INVENTION

One embodiment of the present invention is a cylinder including grooving in the inner peripheral surface of the cylinder, wherein the grooving includes a honed groove and recessed grooves of which the groove widths and groove depths are more than those of the honed groove, the honed groove and the recessed grooves extend in the circumferential direction of the cylinder and include an inclination angle with respect to a direction perpendicular to the axis direction of the cylinder, and a length of 4 mm in which four or more of the recessed grooves exist in the axis direction of the cylinder in a region (hereinafter also referred to as "center region") in which an oil ring slides in a case in which a crank angle is 50° or more and 140° or less can be selected on the inner peripheral surface of the cylinder. The present embodiment is described with reference to FIG. 1.

Figure 1:
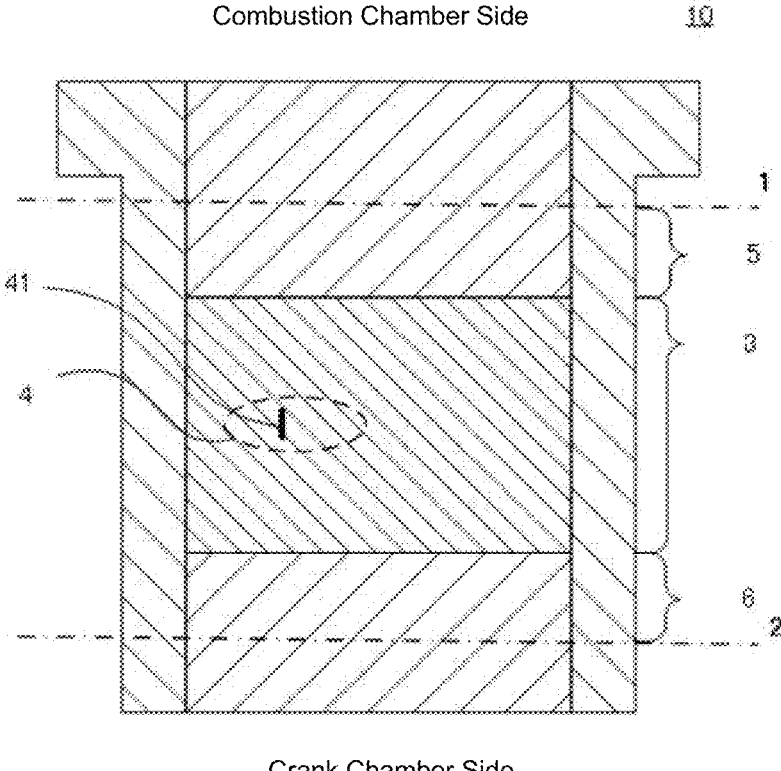
FIG. 1 is a cross-sectional schematic view of a cylinder liner according to the present embodiment.

FIG. 1 is a cross sectional view of a cylinder liner. The cylinder may have a structure in which a cylinder liner made of cast iron is insert-cast with a block made of aluminum alloy, may have a monoblock structure made of cast iron, or may have a structure in which a dry liner made of cast iron or a wet liner made of cast iron are inserted. However, an aspect in which the cylinder liner is used is described below.

The cylinder liner 10 is typically a cylinder liner made of cast iron and may be formed of aluminum alloy or copper alloy, and the material thereof is not particularly limited.

The cylinder liner 10 is placed on the cylinder block of an internal combustion engine, and a piston slides therein in an upward-downward direction illustrated in FIG. 1 (axis direction of cylinder liner). In FIG. 1, a combustion chamber side corresponds to "upward" in the view, and a crank chamber side corresponds to "downward" in the view.

An alternate long and short dash line 1 illustrated in FIG. 1 indicates the top dead point of an oil ring, and an alternate long and short dash line 2 indicates the bottom dead point of the oil ring.

The inner peripheral surface of the cylinder liner 10 in FIG. 1 includes grooving, and the grooving includes a honed groove and recessed grooves of which the groove widths and the groove depths are more than those of the honed groove.

The honed groove may be a working groove honed by a known method, and the number of times of the honing, and the shape, kind, particle size, and the like of a grindstone used in the honing are not particularly limited. A cross hatch may also be formed on the inner peripheral surface of the cylinder liner by the honing. In the case of forming the cross hatch, and the angle (acute angle) thereof is preferably 2° or more, may be 5° or more, and may be 10° or more. Moreover, the angle is typically 60° or less, may be 45° or less, may be 30° or less, and may be 15° or less.

The recessed grooves of which the groove widths and groove depths are more than those of the honed groove are grooves formed by a method different from the honing, and can be formed by, for example, grinding, plastic working, etching, laser working, or the like of a surface of the cylinder liner. In the present embodiment, the area of contact with the piston and the piston ring in sliding can be reduced to reduce the shearing resistance of oil by forming a recessed groove which can become an oil pocket.

The size of such a recessed groove is not particularly limited as long as the groove width and groove depth of the recessed groove are more than those of the honed groove. From the viewpoint of obtaining the shearing resistance reduction effect of oil, the lower limit of the groove width of the recessed groove is preferably 30 μm or more, more preferably 50 μm or more, still more preferably 70 μm or more, and particularly preferably 100 μm or more. In contrast, since the excessively large groove width of the recessed groove results in an increase in the surface pressure of the piston ring, is prone to cause the piston ring to be worn, and also precludes production of the recessed groove, the upper limit of the groove width is preferably 860 μm or less, may be 800 μm or less, may be 500 μm or less, and may be 300 μm or less. The groove depth thereof is typically 1.0 to 2.0 μm, may be 0.5 μm or more, may be 0.7 μm or more, may be 10.0 μm or less, and may be 9.0 μm or less. In an example, the groove width thereof is around 200 μm, and the depth thereof is around 1.0 μm.

The groove widths of the honed groove and the recessed grooves can be measured at a 5000-fold magnification in the diametrical direction and a 100-fold magnification in the axis direction by, for example, a contact-type roughness gauge (SURFCORDER SE600 manufactured by Kosaka Laboratory Ltd.). For measurement spots, measurement is performed at three spots in the axis direction and at four spots at spacings of 90° in the circumferential direction from each measurement spot in the axis direction, that is, at 12 spots in total, and the mean value of the lengths of the maximum openings in the axis direction in respective profile curved lines is regarded as a groove width. A measurement magnification may be changed as appropriate depending on the minimum value of the groove width of a target to be measured, and, for example, in the case of measuring the honed groove, the measurement may be performed at a 5000-fold magnification in the diametrical direction and a 500-fold magnification in the axis direction.

A non-contact-type laser measurement instrument (for example, VK-X1000 manufactured by KEYENCE CORPORATION) may also be used as an instrument for measuring a groove width.

In the present embodiment, a central region 3 which is a region in which the oil ring slides in a case in which a crank angle is 50° or more and 140° or less in the inner peripheral surface of the cylinder liner 10 includes the recessed grooves described above to reduce friction in the vicinity of a stroke center with a large work load. This is described with reference to FIG. 2.

Figure 2:
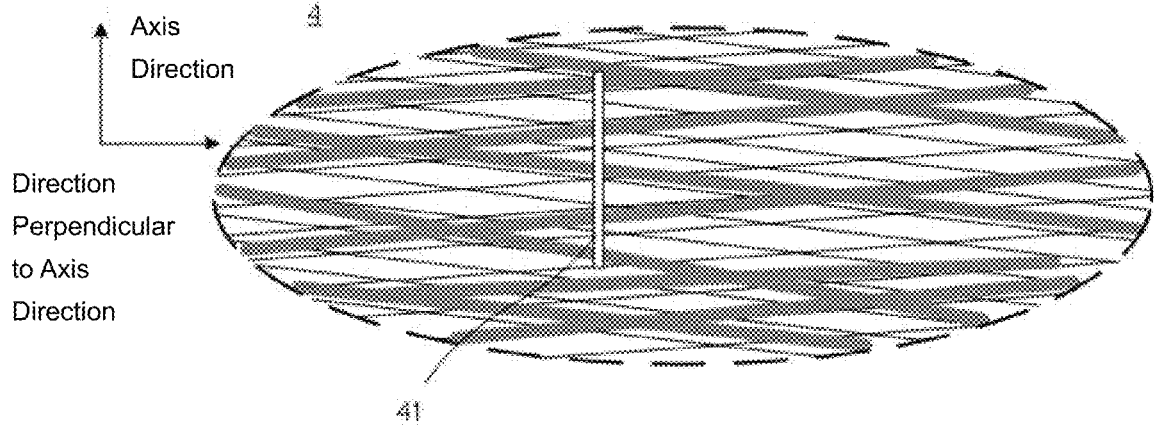
FIG. 2 is an enlarged schematic view of an enlarged part of the inner peripheral surface of the cylinder liner according to the present embodiment.

FIG. 2 is an enlarged schematic view of an enlarged dashed line region 4 in the central region 3 in FIG. 1.

The dashed line region 4 includes honed grooves represented by thin lines in the view and recessed grooves represented by thick lines in the view. The honed grooves and the recessed grooves extend in the circumferential direction of the cylinder, and have inclination angles in a direction perpendicular to the axis direction of the cylinder. The angles of the inclination angles of the honed grooves are not particularly limited.

The inclination angles of the recessed grooves are not particularly limited either, but may be 2° or more, may be 5° or more, and may be 10° or more. The inclination angles are typically 60° or less, may be 45° or less, may be 30° or less, and may be 15° or less. The recessed grooves are preferred because the recessed grooves cross each other in a region in which an oil ring slides in a case in which the crank angle described above is 50° or more and 140° or less, whereby a sliding environment becomes further uniform.

In the present embodiment, a length 41 of 4 mm can be selected so that four or more of the recessed grooves exist in the axis direction of the cylinder. Five recessed grooves exist in the length 41 in FIG. 2. As described above, the inner peripheral surface of the cylinder does not merely include the recessed grooves, but the recessed grooves are formed so that the length of 4 mm in which four or more of the recessed grooves exist in the axis direction of the cylinder in the central region can be selected, whereby the area of contact with a piston and a piston ring in sliding can be reduced to reduce the shearing resistance of oil.

The number of recessed grooves existing in the length 41 of 4 mm is not particularly limited as long as being four or more. An aspect in which the length 41 of 4 mm can be selected so that five or more recessed grooves exist is also acceptable. An aspect in which six or more recessed grooves exist is also acceptable. In contrast, since too many recessed grooves may result in the deterioration of oil consumption performance, the upper limit of recessed grooves existing in the length of 4 mm preferably 60 or less, may be 40 or less, and may be 20 or less.

Since a recessed groove sinking toward an outer periphery is detected when the roundness of the inner peripheral surface of the cylinder is measured, the presence of the recessed groove can also be known by measuring the roundness of the inner peripheral surface of the cylinder.

It is preferable that the selected length of 4 mm further satisfies at least one of parameters described in the following (i) to (vi):

(i) a mean depth W of a waviness motif of an envelope waviness curve is 0.28 μm or more;

(ii) (mean depth W of waviness motif of envelope waviness curve)×(mean length AW of waviness motif) is 80 μm² or more and 300 μm² or less;

(iii) (difference Rke between levels of cores of envelope waviness curve)/(difference Rk between levels of cores of roughness curve) is 0.6 or less;

(iv) (mean depth Rvke of protruding trough of envelope waviness curve)/(mean depth Rvk of protruding trough of roughness curve) is 0.9 or less;

(v) (mean height Rpke of protruding crest+difference Rke between levels of cores+mean depth Rvke of protruding trough, of envelope waviness curve)/(mean height Rpk of protruding crest+difference Rk between levels of cores+mean depth Rvk of protruding trough, of roughness curve) is 0.9 or less; and (vi) (mean depth Rvke of protruding trough of envelope waviness curve)/(mean depth W of waviness motif of envelope waviness curve) is 1.0 or less.

The satisfaction of the mean depth W in (i) is preferred because of resulting in enhanced oil retentivity. The mean depth W is preferably 0.4 or more, and the upper limit thereof is not particularly limited but is typically 1.0 or less.

The satisfaction of the value of W×AW in (ii) is preferred because of enabling obtainment of a further friction reduction effect. The value of W×AW is preferably 90 or more, and preferably 270 or less.

The satisfaction of the value of Rke/Rk in (iii) is preferred because of enabling obtainment of a further friction reduction effect. The value of Rke/Rk is preferably 0.5 or less, and the lower limit thereof is not particularly limited but is typically 0.1 or more.

The satisfaction of the value of Rvke/Rvk in (iv) is preferred because of enabling a reduction in the shearing resistance of oil. The value of Rvke/Rvk is preferably 0.7 or less, and the lower limit thereof is not particularly limited but is typically 0.05 or more.

The satisfaction of the value of (Rpke+Rke+Rvke)/(Rpk+Rk+Rvk) in (v) results in the preferable shapes of the recessed grooves on the surface of the cylinder, and is preferred. The value of (Rpke+Rke+Rvke)/(Rpk+Rk+Rvk) is preferably 0.75 or less, and the lower limit thereof is not particularly limited but is typically 0.1 or more.

The satisfaction of the value of Rvke/W in (vi), that is, allowing of the value of Rvke with respect to W to be less than that of the inner peripheral surface of the cylinder subjected to conventional honing is preferred because of enabling obtainment of a friction reduction effect. Rvke/W is preferably 0.75 or less, and the lower limit thereof is not particularly limited but is typically 0.1 or more.

Motif parameters including Rke, Rvke, Rpke, W, and AW are measured in conformity with ISO12085, and the mean of values measured at four spots in the circumferential direction of the cylinder is adopted. An evaluation length defined in ISO is 3.2 mm, and optional 3.2 mm in 4 mm that is a target to be measured may be measured.

The measurement conditions of roughness parameters including Rk, Rvk, and Rpk are in conformity with ISO4287, and the mean of values measured at four spots in the circumferential direction of the cylinder is adopted. An evaluation length defined in ISO is 4.0 mm.

In the inner peripheral surface of the cylinder liner according to the present embodiment, the portion other than the honed groove and the recessed grooves is not particularly limited as long as the honed groove and the recessed grooves exist to satisfy specific requirements in the central region 3 described above. The entire surface of the inner peripheral surface may be honed, or may be subjected to coating treatment such as thermal spraying coating by thermal spraying.

Among them, an aspect in which it is impossible to select a length of 4 mm in which four or more of the recessed grooves exist in the axis direction of the cylinder in a region in which an oil ring slides in a case in which a crank angle including a top dead point is 0° or more and less than 50° (hereinafter also referred to as "top dead point region"; a region denoted by reference numeral 5 in FIG. 1) on the inner peripheral surface of the cylinder is preferred from the viewpoint of preventing oil consumption performance and friction characteristics from being considerably deteriorated, and an aspect in which the recessed grooves do not exist is more preferred.

In addition, an aspect in which it is impossible to select a length of 4 mm in which four or more of the recessed grooves exist in the axis direction of the cylinder in a region in which an oil ring slides in a case in which a crank angle including a bottom dead point is more than 140° and 180° or less (hereinafter also referred to as "bottom dead point region"; a region denoted by reference numeral 6 in FIG. 1) is preferred. Since a recessed groove inhibits hydraulic pressure from being generated in a case in which the recessed groove exists in the bottom dead point region, friction characteristics may deteriorate, and therefore, an aspect in which no recessed groove exists is more preferred.

A length of 4 mm in which four or more of the recessed grooves exist in the axis direction of the cylinder in a region in which an oil ring slides particularly in a case in which a crank angle is 80° to 110° in the central region 3 can be preferably selected from the viewpoint of obtaining a further friction reduction effect.

Although a region in which an oil ring slides on the inner peripheral surface of the cylinder varies depending on the design of the engine, commonly, a region in which oil ring slides is a region between the ⅕ position of the overall length and the ¾ position of the overall length, starting from the upper end of a cylinder liner, and recessed grooves exist in the whole or part of this range. As an example, in a case in which the bore diameter of an engine is φ 100 mm, the overall length of the cylinder liner is around 194 mm, and a range of around 39 mm to 146 mm from the upper end of a cylinder liner corresponds to the region in which the oil ring slides.

Means for forming a honed groove and a recessed groove may be applied as appropriate so as to satisfy the requirements described above in the case of forming the inner peripheral surface of the cylinder of the present embodiment.

Even in the case of a cylinder block in which a cylinder liner is not placed, the inner peripheral surface of the cylinder block can be worked like the inner peripheral surface of the cylinder liner.

The bore diameter of the cylinder is not particularly limited, and the above-described recessed groove shape can be applied to cylinders having various bore diameters. In view pf production, the bore diameter is preferably φ 50 mm or more, and more preferably φ 60 mm or more, and preferably φ 250 mm or less, and more preferably φ 200 mm or less.

EXAMPLES

The present invention is described in more detail below with reference to Examples. However, the present invention is not limited only to the following Examples.

A cylinder liner having an inner diameter (bore diameter) of φ 83 mm and a wall thickness of 1.5 mm was prepared using a cast iron material. The inner peripheral surface of the cylinder liner was finished by honing (cross hatch: acute angle of) 20° so that Rvk was 0.17 to 2.50 μm (Examples 1 to 4), 0.88 to 1.22 μm (Examples 5 to 7), 0.50 to 0.75 μm (Examples 8 to 9), 0.41 to 0.86 μm (Examples 10 to 13), and 0.38 to 0.46 μm (Examples 14 to 16).

Examples 1 to 16

Then, in a case in which the position of the top dead point of the oil ring of a piston in which a piston ring was attached to the cylinder liner was set at a crank angle of 0°, and the position of the bottom dead point of the oil ring was set at a crank angle of 180°, a sliding region at a crank angle of 80° or more and 110° or less in the inner peripheral surface of the cylinder liner was honed to have low roughness in Examples 1, 5 to 7, and 14 to 16, honed to have high roughness in Examples 2 to 4, and honed to have usual roughness in Examples 8 to 13, and recessed grooves of which the groove widths and groove depths were more than those of honed grooves were then formed. The depths of the recessed grooves were changed as appropriate in Examples 5 to 13, and the depths of the recessed grooves were allowed to be uniform in Examples 1 to 4, and 14 to 16.

The recessed grooves were formed at a mean inclination angle of 2.5° with respect to a direction perpendicular to the axis direction of the cylinder liner. Moreover, a length of 4 mm in which four or more of the recessed grooves existed in the axis direction of the cylinder in the region of each cylinder liner according to Examples 1 to 16 at a crank angle of 80° or more and 110° or less was able to be selected by the working described above. In contrast, in a region in which the crank angle of each cylinder liner according to Examples 1 to 16 was 0° or more and less than 50°, and in a region of more than 140° and 180° or less, a length of 4 mm in which four or more of the recessed grooves existed in the axis direction of the cylinder was not able to be selected.

The contour curved line of the inner peripheral surface of the cylinder liner was obtained for the selected length in which four or more of the recessed grooves existed, and each value of Rk, Rpk, Rvk, Rke, Rpke, Rvke, W, and AW was calculated. The results are set forth in Table 1.

Comparative Examples 1 to 6

The inner peripheral surfaces of cylinder liners were worked to have roughness in Table 2 by honing the surfaces.

In addition, recessed grooves of which the groove widths and groove depths were more than those of honed grooves were formed in Comparative Example 6. A length of 4 mm in which four or more of the recessed grooves existed in the axis direction of the cylinder was not able to be selected in each region of the surfaces of the cylinder liners according to Comparative Examples 1 to 6.

The groove widths of the recessed grooves formed in the cylinder liners, obtained as described above, according to Examples 1 to 16 and Comparative Examples 1 to 6 were measured at a 5000-fold magnification in the diametrical direction and a 100-fold magnification in the axis direction by a contact-type roughness gauge (SURFCORDER SE600 manufactured by Kosaka Laboratory Ltd.). For measurement spots, measurement was performed at three spots in the axis direction and four spots at spacings of 90° in the circumferential direction from each measurement spot in the axis direction, that is, at 12 spots in total, and the mean value of the lengths of the maximum openings in the axis direction in respective profile curved lines was regarded as a groove width. The groove widths of the honed grooves in Comparative Examples 1 to 5 including no recessed groove were measured at a 5000-fold magnification in the diametrical direction and a 500-fold magnification in the axis direction. The results are set forth in Tables 1 and 2.

The cylinder liners according to Examples 1 to 16 and Comparative Examples 1 to 6, obtained as described above, were subjected to the following friction test and oil consumption actual machine test.

<Friction Test>

Figure 3:
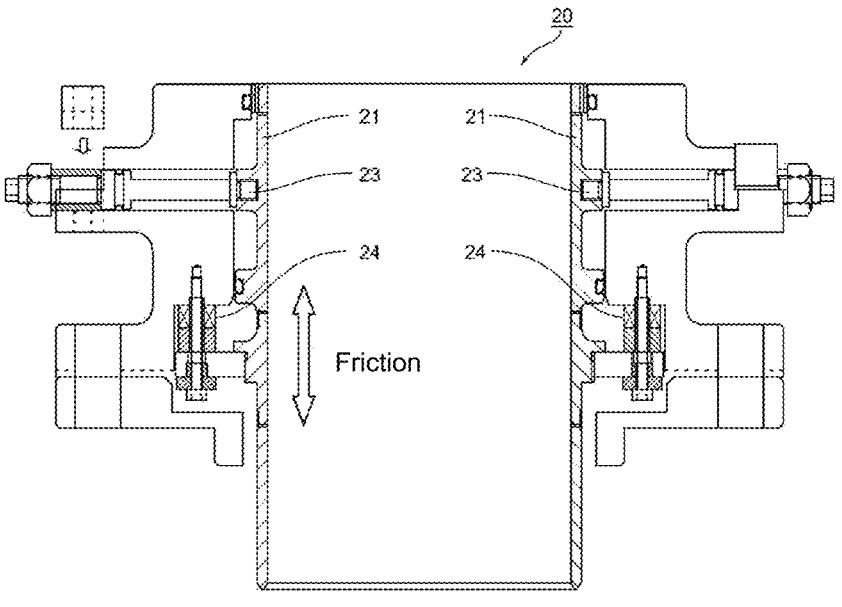
FIG. 3 is a cross-sectional schematic view of a test machine for a friction test conducted in Examples.

The friction test was conducted in motoring evaluation open to the atmosphere by a one-cylinder floating liner test machine (test machine detecting change in friction of piston and piston ring in one cycle). In the friction test, a crank-type one-cylinder motoring test machine 20 (floating liner method) having a bore diameter of φ 83 mm and a stroke of 86 mm was used. FIG. 3 illustrates a cross-sectional schematic view of the crank-type one-cylinder motoring test machine used in the friction test. A cylinder liner 21 has a structure in which the behavior thereof in the diametrical direction is restricted by a stopper 23, and the cylinder liner can be moved only in the axis direction. Sliding friction force acting on the cylinder liner 21 in the axis direction is sensed by a sensor 24 attached to the cylinder liner 21. Evaluation was performed with friction mean effective pressure (FMEP) obtained by dividing friction torque per cycle of the sliding friction force by an engine displacement.

The temperature of cooling water was set at 80° C. and the temperature of engine oil was set at 80° C. as test conditions, 10W-30 (viscosity classification: SAE J300) was used as the engine oil, and measurement was performed at an evaluation rotation number between 600 rpm and 2000 rpm.

FMEP was classified, according to the following criteria, on the basis of a relative value in a case in which the value of Comparative Example 3 (BM) was set at 100%, and A and B were regarded as acceptable levels. The results are set forth in Tables 1 and 2.

Not more than 80%: A.

More than 80% and 90% or less: B.

More than 90% and 100% or less: C

More than 100%: D

<Oil Consumption Actual Machine Test>

In the oil consumption actual machine test, an 8-L glass diesel engine was used. New oil was used as oil during driving, the driving was performed for predetermined time at 2000 rpm×full load, and a difference between the weights of the oil before and after the driving was compared by a sampling method.

Oil consumption was classified, according to the following criteria, on the basis of a relative value in a case in which the value of Comparative Example 3 (BM) was set at 100%, and α and β were regarded as acceptable levels. The results are set forth in Tables 1 and 2.

More than 100% and 110% or less: α

More than 110% and 130% or less: β

Not less than 130%: γ

These results revealed that appropriate formation of recessed grooves in the region enabled friction to be reduced without considerably deteriorating oil consumption performance.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Capability of selecting 4 mm of four or more of recessed grooves at 50° to 140° | Capable | Capable | Capable | Capable | Capable | Capable | Capable | Capable | Capable | Capable |
| Capability of selecting 4 mm of four or more of recessed grooves at 0° to less than 50° | Incapable | Incapable | Incapable | Incapable | Incapable | Incapable | Incapable | Incapable | Incapable | Incapable |
| Presence or absence of cross of recessed grooves | Present | Present | Present | Present | Present | Present | Present | Present | Present | Present |
| Groove width (mm) of recessed grooves | 0.853 | 0.791 | 0.517 | 0.423 | 0.325 | 0.354 | 0.280 | 0.344 | 0.329 | 0.222 |
| W(μm) | 0.83 | 0.75 | 0.53 | 0.98 | 0.51 | 0.73 | 0.50 | 0.40 | 0.56 | 0.76 |
| W × A (μm²) | 225 | 200 | 156 | 294 | 162 | 247 | 147 | 123 | 172 | 217 |
| Rke/Rk | 0.5 | 0.5 | 0.4 | 0.4 | 0.2 | 0.2 | 0.3 | 0.4 | 0.3 | 0.4 |
| Rvke/Rvk | 0.7 | 0.2 | 0.2 | 0.4 | 0.1 | 0.2 | 0.2 | 0.6 | 0.3 | 0.5 |
| (Rpke + Rke + Rvke)/(Rpk + Rk + Rvk) | 0.7 | 0.2 | 0.2 | 0.8 | 0.2 | 0.2 | 0.3 | 0.6 | 0.4 | 0.6 |
| Rvke/W | 0.1 | 0.6 | 0.9 | 1.0 | 0.2 | 0.2 | 0.4 | 0.7 | 0.5 | 0.5 |
| FMEP | A | A | B | A | B | A | B | B | B | A |
| Oil comsumption | β | β | β | α | β | β | β | β | β | β |

| | Example 11 | Example 12 | Example 13 | Example 14 | Example 15 | Example 16 |
|---|---|---|---|---|---|---|

TABLE 1-continued

| | | | | | | |
|---|---|---|---|---|---|---|
| Capability of selecting 4 mm of four or more of recessed grooves at 50° to 140° | Capable | Capable | Capable | Capable | Capable | Capable |
| Capability of selecting 4 mm of four or more of recessed grooves at 0° to less than 50° | Incapable | Incapable | Incapable | Incapable | Incapable | Incapable |
| Presence or absence of cross of recessed grooves | Present | Present | Present | Present | Present | Present |
| Groove width (mm) of recessed grooves | 0.188 | 0.193 | 0.116 | 0.075 | 0.054 | 0.035 |
| W(μm) | 0.84 | 0.54 | 0.29 | 0.50 | 0.45 | 0.37 |
| W × A (μm²) | 268 | 166 | 87 | 155 | 122 | 107 |
| Rke/Rk | 0.4 | 0.5 | 0.6 | 0.5 | 0.5 | 0.5 |
| Rvke/Rvk | 0.5 | 0.7 | 0.9 | 0.7 | 0.7 | 0.8 |
| (Rpke + Rke + Rvke)/ (Rpk + Rk + Rvk) | 0.6 | 0.7 | 0.9 | 0.6 | 0.7 | 0.7 |
| Rvke/W | 0.4 | 0.7 | 1.0 | 0.7 | 0.8 | 0.9 |
| FMEP | A | B | B | B | B | B |
| Oil comsumption | β | β | α | α | α | α |

TABLE 2

| | Comparative Example 1 | Comparative Example 2 | Comparative Example 3 | Comparative Example 4 | Comparative Example 5 | Comparative Example 6 |
|---|---|---|---|---|---|---|
| Capability of selecting 4 mm of four or more of recessed grooves at 50° to 140° | Incapable | Incapable | Incapable | Incapable | Incapable | Incapable |
| Capability of selecting 4 mm of four or more of recessed grooves at 0° to less than 50° | Incapable | Incapable | Incapable | Incapable | Incapable | Incapable |
| Presence or absence of recessed groove at 50° to 140° | Absent | Absent | Absent | Absent | Absent | Present |
| Presence or absence of cross of recessed grooves | — | — | — | — | — | Absent |
| Groove width (mm) of honed groove | 0.022 | 0.032 | 0.018 | 0.020 | 0.015 | 0.252 |
| W(μm) | 1.08 | 1.18 | 0.1 | 0.27 | 0.18 | 0.26 |
| W × A (μm²) | 311 | 337 | 27 | 74 | 51 | 75 |
| Rke/Rk | 1.0 | 0.8 | 0.9 | 0.7 | 0.8 | 0.4 |
| Rvke/Rvk | 0.9 | 0.9 | 0.9 | 0.9 | 1.0 | 0.5 |
| (Rpke + Rke + Rvke)/ (Rpk + Rk + Rvk) | 1.3 | 1.2 | 1.2 | 1.0 | 1.0 | 0.6 |
| Rvke/W | 1.1 | 1.2 | 1.6 | 1.1 | 1.0 | 1.5 |
| FMEP | C | C | BM | C | C | D |
| Oil comsumption | γ | γ | BM | α | α | α |

DESCRIPTION OF SYMBOLS

10 Cylinder liner
1 Top dead point of oil ring
2 Bottom dead point of oil ring
3 Central region
4 Dashed line region
41 Length
5 Top dead point region
6 Bottom dead point region
20 Crank-type one-cylinder motoring test machine
21 Cylinder liner
23 Stopper
24 Sensor

The invention claimed is:

1. A cylinder comprising grooving in an inner peripheral surface of the cylinder, wherein the grooving comprises a honed groove and recessed grooves of which groove widths and groove depths are more than those of the honed groove, the honed groove and the recessed grooves extend in a circumferential direction of the cylinder and comprise an inclination angle with respect to a direction perpendicular to an axis direction of the cylinder, and wherein the recessed grooves are formed so that a length of 4 mm in which four or more of the recessed grooves exist in an axis direction of the cylinder in a region in which an oil ring slides in a case in which a crank angle is 50° or more and 140° or less on the inner peripheral surface of the cylinder.

2. The cylinder according to claim 1, wherein the recessed grooves comprise a point at which the recessed grooves cross each other in the region in which the oil ring slides in the case in which the crank angle is 50° or more and 140° or less.

3. The cylinder according to claim 1, wherein the recessed grooves comprise a groove width of 30 μm or more.

4. The cylinder according to claim 1, wherein in the selected length of 4 mm, a mean depth W of a waviness motif of an envelope waviness curve is 0.28 μm or more.

5. The cylinder according to claim 1, wherein, in the selected length of 4 mm, (mean depth W of waviness motif of envelope waviness curve)×(mean length AW of waviness motif) is 80 μm² or more and 300 μm² or less.

6. The cylinder according to claim 1, wherein, in the selected length of 4 mm, (difference Rke between levels of cores of envelope waviness curve)/(difference Rk between levels of cores of roughness curve) is 0.6 or less.

7. The cylinder according to claim 1, wherein, in the selected length of 4 mm, (mean depth Rvke of protruding trough of envelope waviness curve)/(mean depth Rvk of protruding trough of roughness curve) is 0.9 or less.

8. The cylinder according to claim 1, wherein, in the selected length of 4 mm, (mean height Rpke of protruding crest+difference Rke between levels of cores+mean depth Rvke of protruding trough, of envelope waviness curve)/ (mean height Rpk of protruding crest+difference Rk between levels of cores+mean depth Rvk of protruding trough, of roughness curve) is 0.9 or less.

9. The cylinder according to claim 1, wherein, in the selected length of 4 mm, (mean depth Rvke of protruding trough of envelope waviness curve)/(mean depth W of waviness motif of envelope waviness curve) is 1.0 or less.

10. The cylinder according to claim 1, wherein a length of 4 mm in which four or more of the recessed grooves exist in an axis direction of the cylinder in a region in which an oil ring slides in a case in which a crank angle comprising a top dead point is 0° or more and less than 50° is incapable of being selected on the inner peripheral surface of the cylinder.

* * * * *